United States Patent
Azure et al.

(10) Patent No.: US 7,980,569 B2
(45) Date of Patent: Jul. 19, 2011

(54) PLATFORM ASSEMBLY FOR USE WITH WORKING VEHICLE

(75) Inventors: John P. Azure, Bloomington, MN (US); Tanner L. Erickson, St. Paul, MN (US); Barry L. Hentges, New Prague, MN (US); David A. Murray, Eagan, MN (US); Greg L. Lawrence, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 697 days.

(21) Appl. No.: 12/029,791

(22) Filed: Feb. 12, 2008

(65) Prior Publication Data

US 2008/0197588 A1 Aug. 21, 2008

Related U.S. Application Data

(60) Provisional application No. 60/901,399, filed on Feb. 15, 2007.

(51) Int. Cl.
*A01D 75/00* (2006.01)
(52) U.S. Cl. .............. 280/32.5; 280/32.7; 280/124.154; 172/433; 172/257; 172/329
(58) Field of Classification Search .............. 280/32.5, 280/32.7, 124.145, 124.154; 172/433, 257, 172/329
See application file for complete search history.

(56) References Cited

U.S. PATENT DOCUMENTS

| 1,404,419 A | 1/1922 | Wright |
|---|---|---|
| 1,948,802 A | 2/1934 | Schroeder |
| 2,910,888 A | 11/1959 | Bergsten |
| 3,485,314 A | 12/1969 | Herr |
| 4,509,769 A | 4/1985 | Weber |
| 4,584,735 A | 4/1986 | Garber |
| 4,735,392 A | 4/1988 | Farmer |
| 4,878,339 A | 11/1989 | Marier et al. |
| 5,004,251 A | 4/1991 | Velke et al. |
| 5,106,256 A | 4/1992 | Murakami et al. |
| 5,117,944 A | 6/1992 | Hurtevent |
| 5,575,140 A | 11/1996 | Bermes et al. |
| 5,577,744 A | 11/1996 | Parks |

(Continued)

FOREIGN PATENT DOCUMENTS

EP 0 485 257 A1 5/1992

(Continued)

OTHER PUBLICATIONS

U.S. Appl. No. 60/901,399, filed Feb. 15, 2007, Azure et al.

(Continued)

*Primary Examiner* — Hau V Phan
*Assistant Examiner* — John R Olszewski
(74) *Attorney, Agent, or Firm* — Mueting, Raasch & Gebhardt, P.A.

(57) ABSTRACT

Operator platform assemblies for use with the working vehicles, e.g., skid steer loaders, and vehicles incorporating the same. The platform assemblies may, in some embodiments, include an arm assembly that attaches to a rear portion of the vehicle and extends rearwardly therefrom as a cantilever member. The platform assembly may pivot from this deployed position to a storage position by pivoting upwardly about a pivot axis proximate the vehicle. A platform is, in some embodiments, pivotally attached to the arm assembly so that the platform may pivot relative to the arm assembly.

18 Claims, 12 Drawing Sheets

U.S. PATENT DOCUMENTS

| | | | |
|---|---|---|---|
| 5,653,466 A | | 8/1997 | Berrios |
| 5,685,554 A | | 11/1997 | Poxleitner |
| 5,697,623 A | * | 12/1997 | Bermes et al. ............... 280/32.7 |
| 5,809,756 A | | 9/1998 | Scag et al. |
| 5,816,614 A | | 10/1998 | Kramer, Jr. et al. |
| 5,909,887 A | | 6/1999 | Hobrath |
| 6,151,811 A | | 11/2000 | Barreto |
| 6,415,532 B1 | | 7/2002 | Bricko et al. |
| 6,443,252 B1 | | 9/2002 | Andes |
| 6,485,036 B1 | | 11/2002 | Bricko |
| 6,488,291 B1 | | 12/2002 | Bellis, Jr. |
| 6,709,223 B2 | | 3/2004 | Walto et al. |
| 6,935,092 B2 | | 8/2005 | Velke et al. |
| 7,004,272 B1 | | 2/2006 | Brown et al. |
| 7,063,341 B2 | | 6/2006 | Tsai |
| 7,114,736 B2 | * | 10/2006 | Stodola et al. ............. 280/164.1 |
| 7,300,061 B1 | | 11/2007 | Omstead |
| 7,458,588 B2 | * | 12/2008 | Kallevig ....................... 280/32.7 |
| 7,624,996 B2 | * | 12/2009 | Velke et al. .................. 280/32.7 |
| 2004/0093840 A1 | | 5/2004 | Velke et al. |
| 2004/0145134 A1 | | 7/2004 | Bares |
| 2006/0103093 A1 | | 5/2006 | Kallevig |
| 2006/0290080 A1 | * | 12/2006 | Vachal ......................... 280/32.7 |
| 2007/0200307 A1 | * | 8/2007 | Bares .......................... 280/32.7 |
| 2009/0072504 A1 | | 3/2009 | Kallevig |

FOREIGN PATENT DOCUMENTS

| | | |
|---|---|---|
| EP | 1 172 285 B1 | 1/2002 |
| GB | 1 346 032 | 2/1974 |

OTHER PUBLICATIONS

"Step-Up™ Operators Platform for Toro Dingo 420/425," Kaltec of Minnesota, Inc. [online]. Retrieved on May 12, 2008. Retrieved from the Internet:<URL:http://web.archive.org/web/20050816161810/www.forkster.com/products/stepup_dingo.asp>;2 pgs. Published Aug. 16, 2005.

"Kanga Multi-Task Compact Skid Steer Loaders 2 Series," Kanga Loaders [product sheet], Jan. 2006, 4 pgs.

* cited by examiner

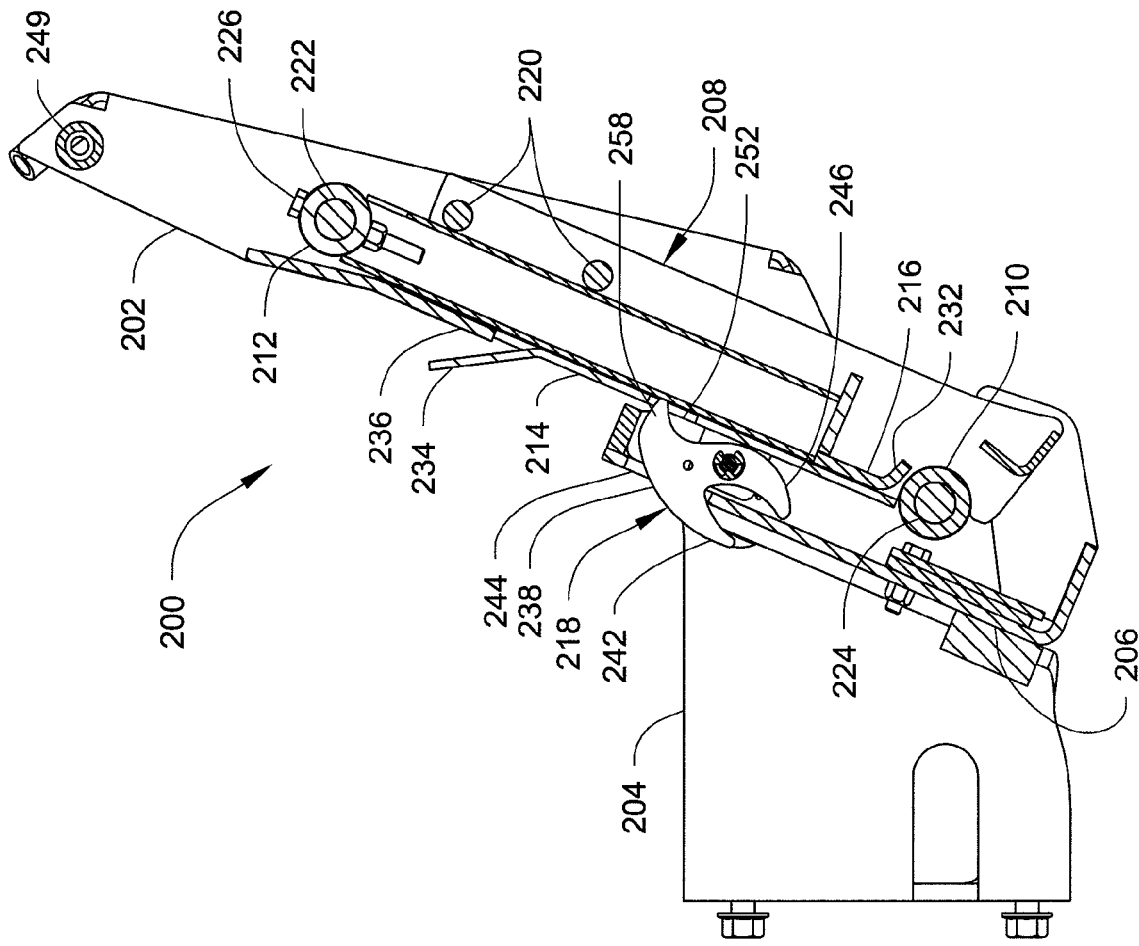

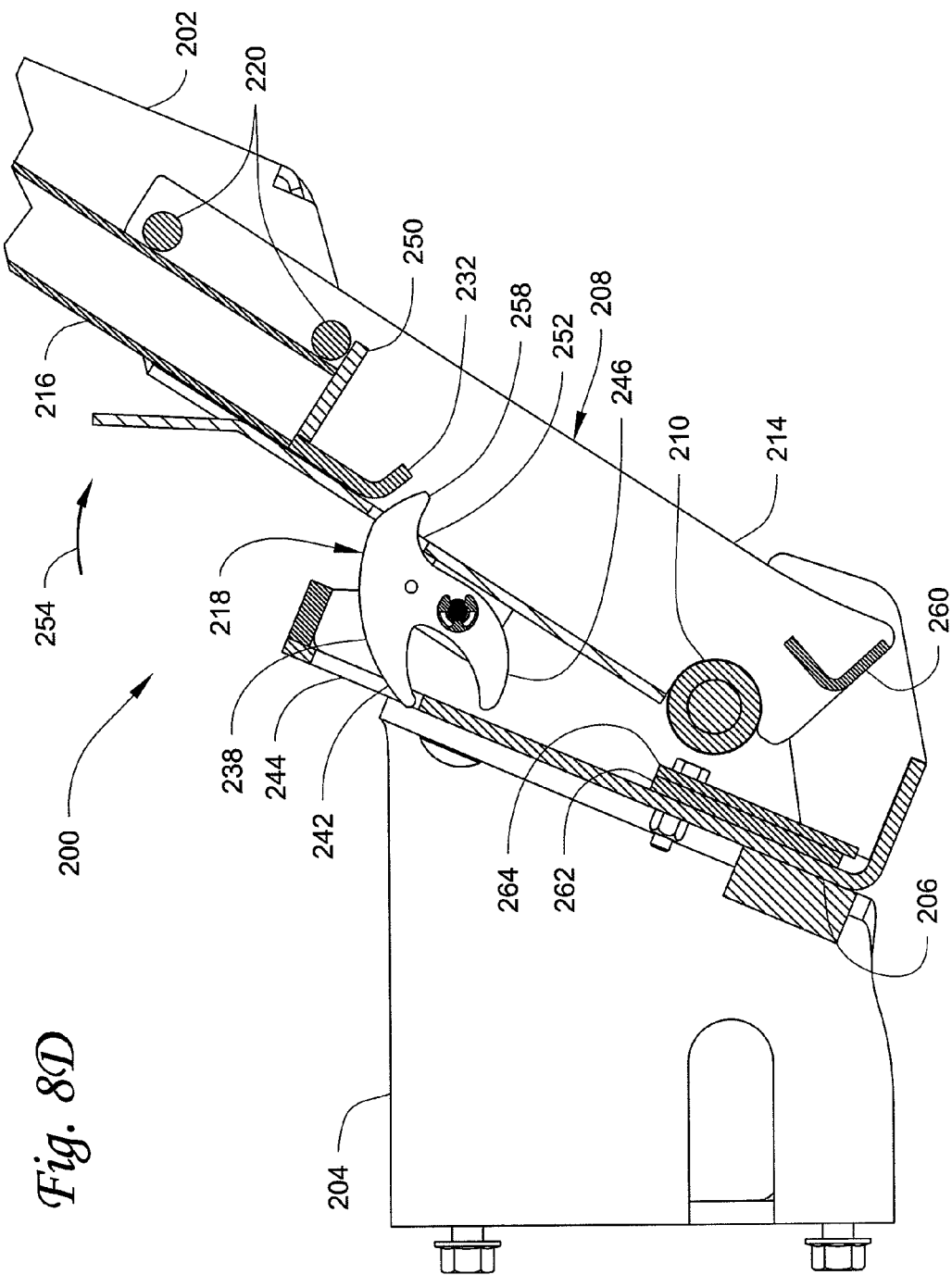

PLATFORM ASSEMBLY FOR USE WITH WORKING VEHICLE

RELATED APPLICATIONS

This application claims the benefit of U.S. Provisional Appl. No. 60/901,399, filed Feb. 15, 2007, which is incorporated herein by reference in its entirety.

TECHNICAL FIELD

The present invention relates generally to working vehicles such as utility loaders of the otherwise walk-behind variety and, more particularly, to ride-on, e.g., stand-on, platform assemblies for use with the same.

BACKGROUND

Walk-behind power machines such as wide-area lawn mowers and compact utility skid-steer loaders have been in use for some time. These vehicles generally include a frame having an engine that not only powers drive members, but an optional implement such as a cutting deck or trencher as well. Rearwardly located controls are typically provided to permit operator control from behind the vehicle. By selectively manipulating the controls, the operator can control the direction and speed of the vehicle. Walk-behind vehicles may provide potential advantages over conventional riding units including, for example, simpler operation, lower operating cost, higher maneuverability, and smaller size.

While effective, operation of walk-behind vehicles may, in certain circumstances, result in premature operator fatigue due to the need to continually walk behind the vehicle during operation. For example, in the commercial landscape and lawn care business, it is not uncommon to operate these machines in excess of eight hours per day.

To address this and other issues, various platforms or sulkies have been developed that attach to a rear portion of the vehicle. These sulkies typically include a ground-engaging member such as a wheel so that the sulky may support the operator in rolling engagement with the ground. The sulky, with the operator in place, may then be pulled across the ground by the vehicle.

While conventional sulkies may advantageously reduce operator fatigue, drawbacks remain. For example, it is sometimes desirable for a vehicle to be able to easily revert to a walk-behind configuration for certain conditions. However, many sulkies are not designed for easy removal, resulting in time-consuming actions to detach/re-attach the sulky. Other configurations provide walk-behind capability by repositioning the sulky to a storage position without removing the sulky from the vehicle. Such sulkies, however, typically require secondary mechanisms, e.g., chains or the like, that must be separately attached to the vehicle in order to secure the sulky in the desired position.

Still further, sulkies may require periodic maintenance to ensure operating effectiveness. For example, conventional pneumatic sulky tires are subject to air leaks and flats, resulting in undesirable vehicle down-time. Further, for example, operation of sulkies in wet areas may result in excessive mud and debris collection on the tire. This debris may eventually interfere with tire rotation (e.g., locking of the tire), which may result in turf damage and/or reduced sulky performance.

SUMMARY

Embodiments of the present invention are directed to platform assemblies for supporting an operator on an otherwise walk-behind working vehicle, and to working vehicles incorporating the same. In one embodiment, the platform assembly is supported by the working vehicle (e.g., cantilevered therefrom) and suspended above a surface of the ground, negating the need for a wheel or other ground-engaging member.

In one embodiment, a platform assembly for use with a ground traversing vehicle is provided, wherein the platform assembly includes an elongate arm assembly having a first end and a second end. The first end is operable to attach to the vehicle such that the arm assembly, when in a first position, forms a cantilever supported by the vehicle at the first end such that the second end of the arm assembly is spaced above a ground surface. An operator platform is also provided and pivotally attached to the second end of the arm assembly for pivoting of the platform, relative to the arm assembly, about a transverse pivot axis.

In another embodiment, a platform assembly for supporting an operator relative to a vehicle and at a location spaced above a ground surface is provided. The platform assembly includes: an attachment apparatus for attaching the platform assembly to the vehicle; and an arm assembly. The arm assembly includes: a first end and a second end, the first end pivotally attached to the attachment apparatus for pivoting of the arm assembly about a first transverse axis, between: a first position corresponding to a deployed position of the platform assembly; and a second position corresponding to a stowed position of the platform assembly. An operator platform is also provided and pivotally attached to the second end of the arm assembly for pivoting of the platform, relative to the arm assembly, about a second transverse axis, wherein when the platform assembly is in the deployed position, the operator platform is supported by the arm assembly above the ground surface.

In yet another embodiment, a skid-steer loader is provided having: a chassis supported for movement over a ground surface by powered ground-engaging members; and an elevated operator platform assembly. The platform assembly includes an arm assembly and a platform. The arm assembly includes: a first arm member having a proximal end pivotally attached to a rear portion of the chassis for pivoting of the arm assembly about a first transverse pivot axis; a second arm member engageable with the first arm member in a telescoping relationship; and a stop member associated with the first arm member. The stop member is configured to restrict pivotal motion of the arm assembly so that a distal end of the second arm member is spaced above a ground surface during loader operation. The platform is pivotally attached to the distal end of the second arm member for pivoting, relative to the second arm member, about a second pivot axis.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 8A-8E are cross sectional views illustrating an exemplary platform assembly, e.g., the platform assembly of FIG. 7, and a method of using the same, wherein: FIG. 8A illustrates the platform assembly latched in the second or stowed position; FIG. 8B illustrates initial unlocking of a latch mechanism of the platform assembly; FIG. 8C illustrates initial movement of the platform assembly from the second or stowed position; FIG. 8D illustrates further movement of the platform assembly towards the first or deployed position; and FIG. 8E illustrates the platform assembly after movement, e.g., pivoting, to the first or deployed position.

Figure 1:
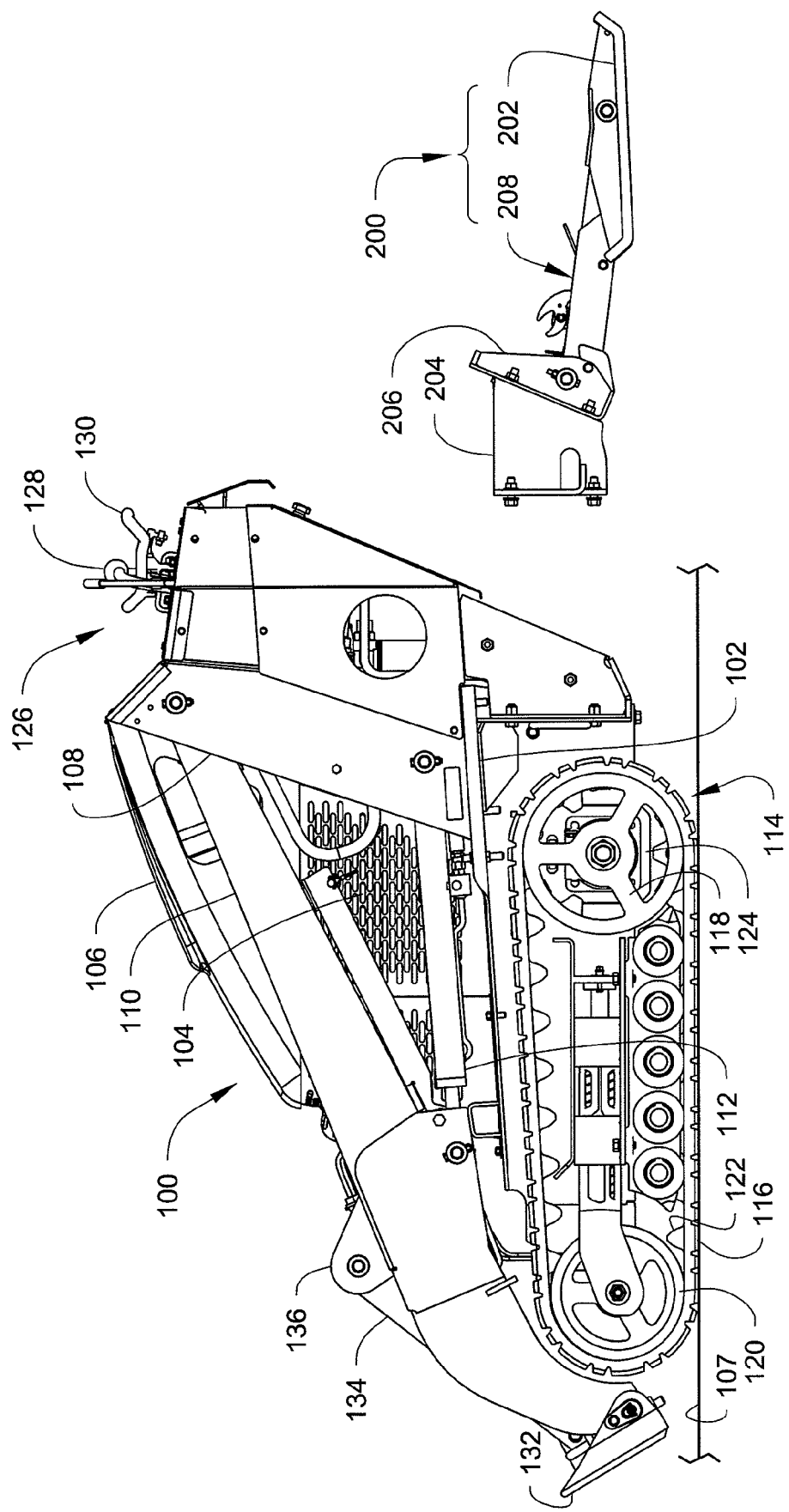
FIG. 1 is a left side elevation view of a working vehicle, e.g., a walk-behind, skid-steer loader, and a platform assembly in accordance with one embodiment of the invention, the latter shown detached from the vehicle.

The figures are rendered primarily for clarity and, as a result, are not necessarily drawn to scale. It is further understood that right side elevation and right rear perspective views corresponding to the left side elevation and left rear perspective views of FIGS. 1-6 are generally mirror images of these views. Moreover, in some figures, various structure may be omitted for clarity.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the invention.

Embodiments of the present invention may be directed to normally walk-behind, self-propelled working vehicles used, for example, to perform ground grooming or ground working operations. More particularly, embodiments of the present invention are directed to platform assemblies for supporting an operator (e.g., in a standing or, alternatively, a sitting position) during operation of the vehicle, and to vehicles incorporating such platform assemblies.

In one exemplary embodiment of the invention, the working vehicle is configured as a ground traversing, compact utility loader 100 as shown in FIG. 1, sometimes referred to as a skid-steer loader. One such loader is the Dingo TX series utility loader sold by The Toro Company of Minneapolis, Minn., USA. The loader 100 may be of the normally walk-behind variety such as that described in more detail in U.S. Pat. No. 6,709,223 to Walto et al. Those of skill in the art will realize that the loader 100 is illustrative only, and platform assemblies in accordance with embodiments of the present invention may be utilized with loaders of other configurations, as well as with other types of working vehicles, e.g., mowers. Moreover, while described primarily in terms of a loader for outdoor use, embodiments of the present invention may also find application to vehicles designed for indoor use without departing from the scope of the invention.

The loader 100 may be used, e.g., by landscape contractors, to perform various ground working operations. For example, a bucket can be attached to the loader 100 for scooping and carrying dirt. Alternatively, a ground leveling plane could be attached and used for leveling the ground surface. Still further, the loader 100 could be configured to perform various ground grooming operations including, for example, snow removal (when a corresponding snow plowing blade is attached thereto), and trenching to name a few.

As described herein, the loader 100 may include a platform assembly 200 (shown detached in FIG. 1) in accordance with embodiments of the present invention. The platform assembly 200 may support the operator relative to the vehicle during operation of the loader 100.

As described herein, the platform assembly 200 may be configured to provide an operator platform 202 that is suspended or cantilevered from a rear portion of the loader by an elongate arm assembly 208. As such, the platform and the operator 140 may be spaced above (e.g., located above) a ground surface 107 during normal vehicle operation (see, e.g., FIG. 3). As used herein, "suspended" or "cantilever" refers to a structure (e.g., the arm assembly 208) that is vertically supported against downward forces at only its single point of attachment (e.g., at the vehicle 100) so that it is free on all sides except the point of attachment. As a result, the loader 100 may bear the weight of the platform assembly/operator without the need for a ground-engaging member such as a wheel. Advantages of platform assemblies configured in accordance with embodiments of the present invention will become apparent from the following description and accompanying figures.

Figure 2:
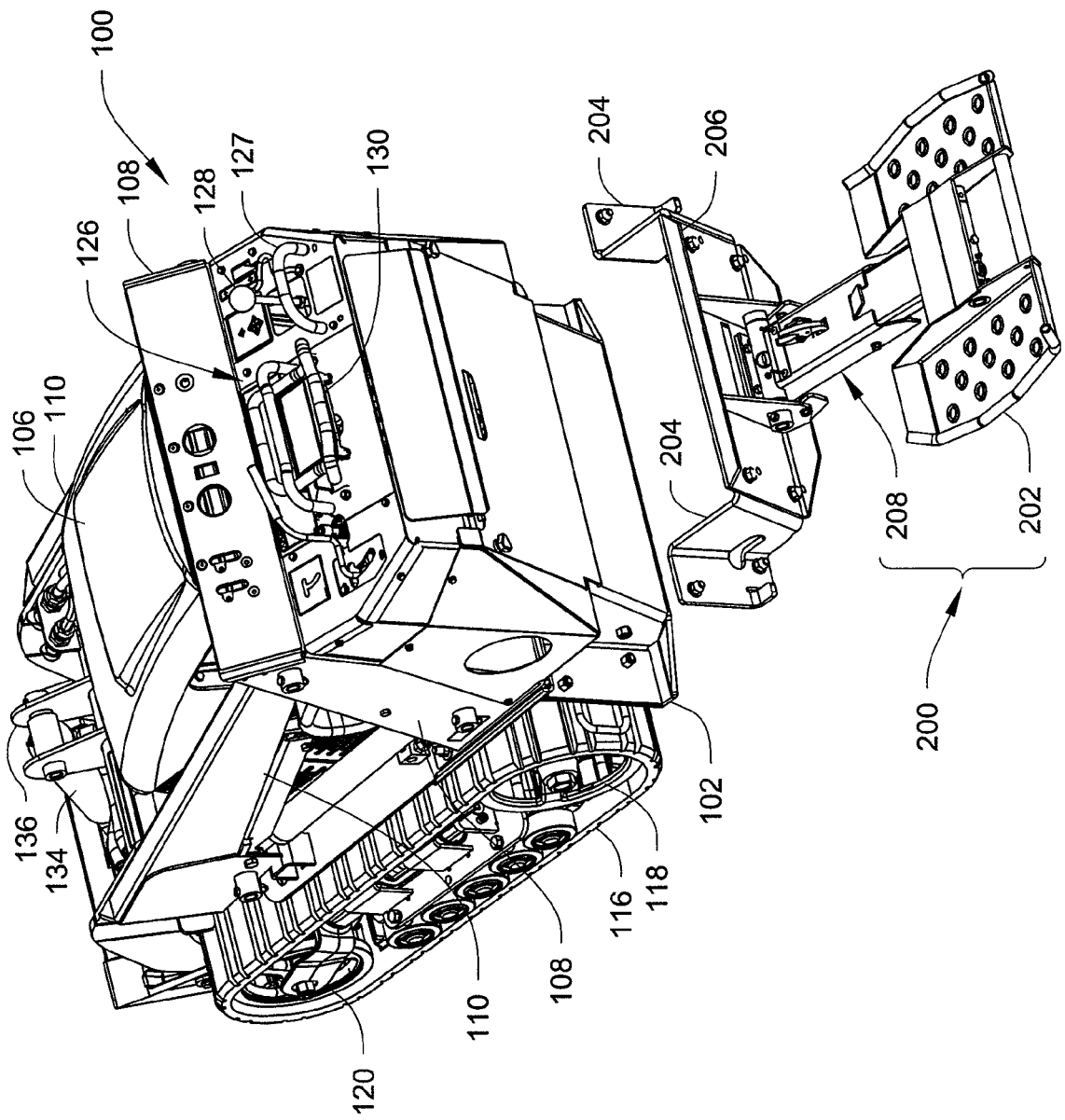
FIG. 2 is a left rear perspective view of the vehicle and platform assembly of FIG. 1.

FIGS. 1 and 2 illustrate the exemplary loader 100 with the platform assembly 200 shown detached. The loader 100 may include a suitably shaped chassis or frame 102 on which a power source, such as an internal combustion engine 104, is carried. A hood or shroud 106 may enclose and cover the engine 104. The loader 100 may further include laterally spaced uprights 108 proximate a rear portion of the frame 102. Left and right loader arms 110 may be pivotally connected to upper ends of the uprights 108 and extend generally towards the front of the loader 100. A hydraulic cylinder 112 (only one visible in FIG. 1) may be connected between the frame 102 and each loader arm 110. When piston rods of the hydraulic cylinders 112 are extended, the loader arms 110 may pivot about the uprights 108 to raise or lift the distal (e.g., front) ends of the loader arms relative to the ground. Likewise, when the piston rods of the hydraulic cylinders 112 are retracted, the loader arms 110 may pivot in the opposite direction to lower the distal ends of the arms.

The loader 100 may further include a traction system 114 that includes both left and right drive tracks 116 (only left track visible in FIG. 1) for moving the loader over the ground surface 107. Each drive track 116 may be configured as an endless, flexible track that is looped or entrained around a rear drive support member 118 and a front idler support member 120. Each drive track 116 has inwardly extending drive lugs 122 that engage apertures or openings in at least the rear drive support member 118.

Each rear drive support member 118 may be driven by a separate hydraulic motor 124 coupled thereto, or by any other suitably motor or drive connection. Rotation of the rear drive support member 118 (via the motor 124) may result in corresponding linear movement of the respective drive track 116 via engagement of the drive lugs 122 on the track with the rear drive support member. As is known in the art, each hydraulic motor 124 may rotate its respective rear drive support member 118 in either a forward (counterclockwise in FIG. 1) or reverse (clockwise) direction to permit propelling of the loader 100 either forwardly or in reverse, respectively. As each rear drive support member 118 may be powered by its own independent drive motor 124, steering control of the loader 100 may be achieved by varying the relative rotational speeds and directions of the motors, and thus the speeds and directions of the individual tracks 116.

The loader 100 may further include a control area 126 that, in the illustrated embodiment, is located near the rear of the loader proximate the upper ends of the uprights 108. The control area 126 may include various controls, e.g., levers 128, that control loader operation, e.g., cause the hydraulic cylinders 112 to lift the loader arms 110. In addition, the control area 126 may also include a movable control handle 130 to control the traction system 114 that drives the loader 100. Once again, exemplary control and traction systems may be described in greater detail elsewhere (see, e.g., U.S. Pat. No. 6,709,223 to Walto et al.).

As mentioned above, ground grooming or ground working attachments (not shown) may be connected to an attachment plate 132 located at the distal front ends of the loader arms 110. To ease the task of removing and installing attachments on the loader arms 110, various quick attachment systems may be used. A hydraulic tilt cylinder 134 (see also FIG. 3) may extend between the attachment plate 132 and a crossmember 136 extending between the loader arms 110 to vary the angle of inclination of attachment plate (relative to loader arms). Thus, by controlling the vertical position of the loader arms 110, and by controlling the angle of inclination of the attachment plate 132 relative to the loader arms, the operator may use the loader 100 to perform a variety of ground grooming and/or ground working operations, depending upon the type of attachment that is coupled to the attachment plate 132.

During conventional operation, the operator may walk behind the loader 100 in a manner similar to that of a walk-behind lawn mower. The control area 126 is positioned at a convenient height to be accessible and gripped by the standing operator. Moreover, the attachment of loader arms 110 relative to the upper ends of the uprights 108 may provide the operator with desirable sight lines to the attachment carried on the attachment plate 132.

To provide the loader 100 with ride-on capability, a platform assembly in accordance with one embodiment of the present invention (e.g., the platform assembly 200 described and illustrated herein) may be provided. In the illustrated embodiments, the platform assembly 200 may include both the platform 202 and an arm assembly 208 that permits attachment of the platform to the loader 100. As stated above, the platform assembly 200 may provide either stand-on (as shown) or, alternatively, sit-down capability to the loader 100. The platform assembly 200 may optionally include one or more operator handles (e.g., handle 127 in FIG. 2) that may be mounted at or near the control area 126. Such a handle 127 may provide a grip for use with vehicle operation from the platform.

In the illustrated embodiments, the platform assembly 200 may also include an attachment apparatus configured to attach the platform assembly to the loader. In one embodiment, the attachment apparatus includes a mounting plate 206 and attachment members 204. The attachment members 204 may be operable to fasten, e.g., bolt, to the frame 102 of the loader 100 (see FIG. 4), while the mounting plate 206 may fasten, e.g., bolt, to the attachment members.

While shown as utilizing the attachment apparatus, other embodiments may attach the platform assembly 200 to the vehicle in other ways, e.g., welding, quick-attach mechanisms, etc. Such other methods may eliminate the need for one or both of the mounting plate 206 and attachment members 204 and permit attachment of the platform assembly directly to the frame 102.

Figure 3:
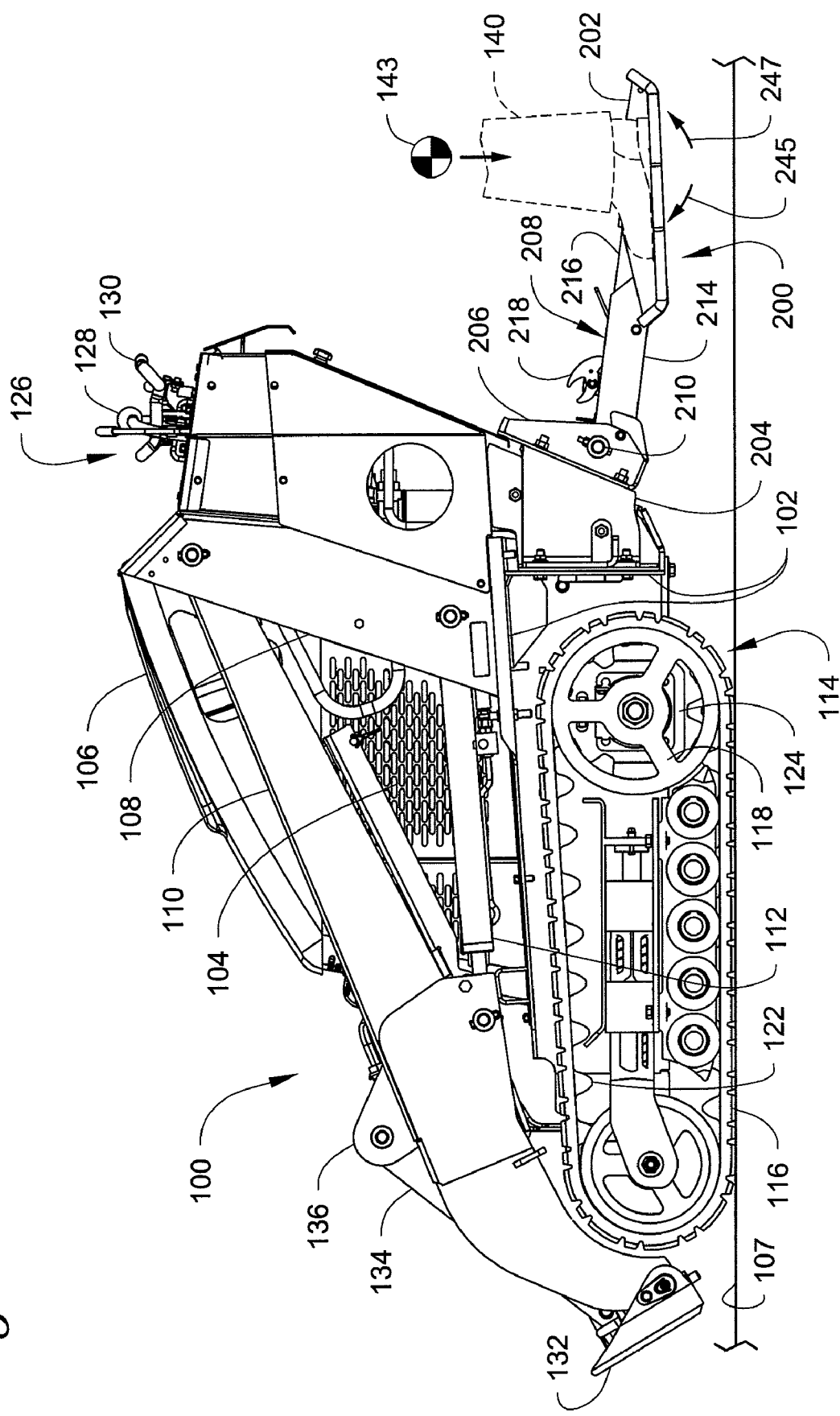
FIG. 3 is a left side elevation view of the vehicle of FIG. 1 with the platform assembly shown attached and in a first or deployed position.
Figure 4:
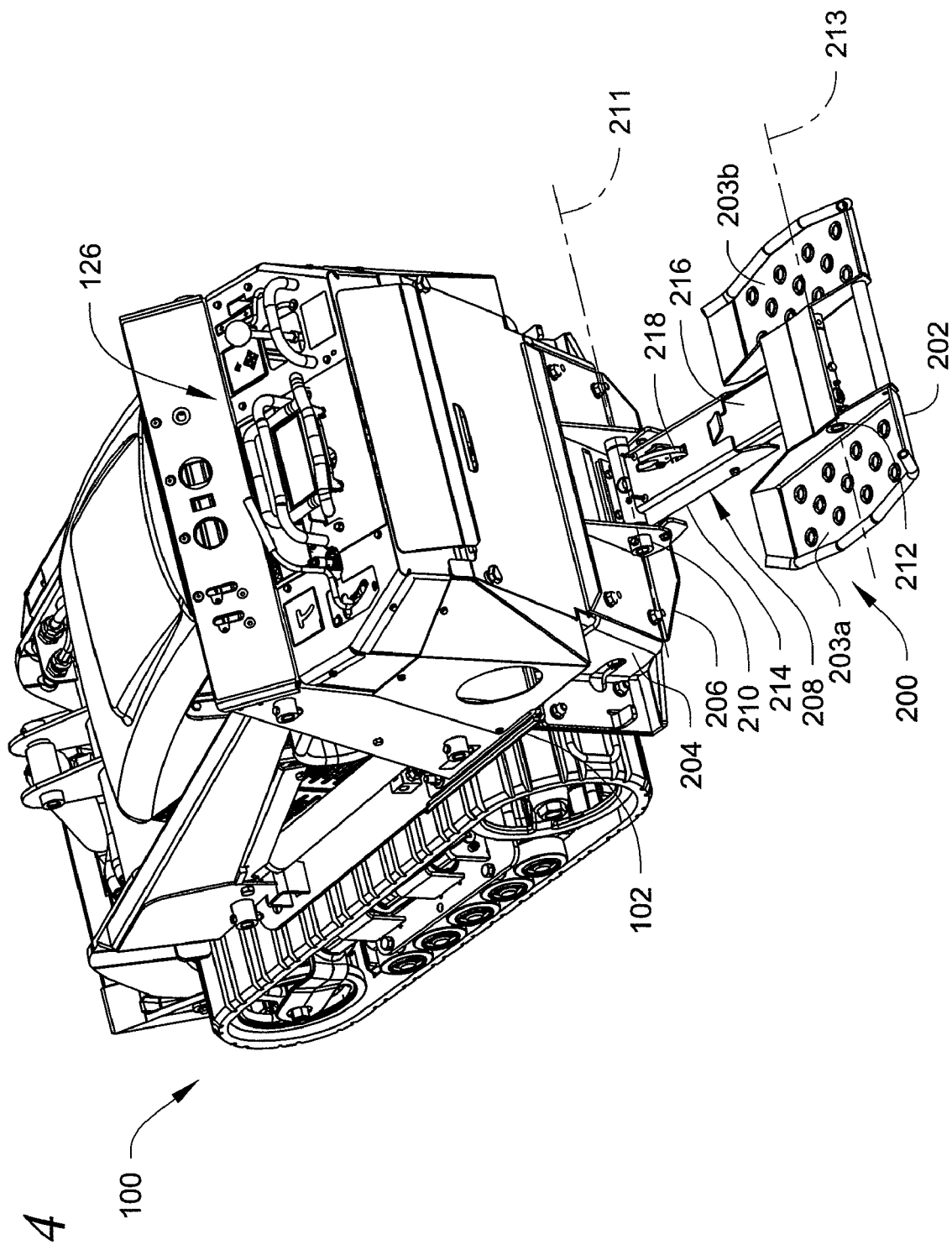
FIG. 4 is a left rear perspective view of the vehicle and platform assembly of FIG. 3.

FIGS. 3 and 4 illustrate the platform assembly 200 after attachment to the vehicle, e.g., loader 100. In these illustrations, the platform assembly 200 is shown in a first or deployed position, e.g., a position to receive the standing operator 140 upon the platform 202.

In one embodiment, the arm assembly 208 may include a proximal or first end attachable to a rear portion of the vehicle such that the arm assembly forms a cantilever supported by the vehicle 100 at the first end (see FIG. 3). A distal or second end of the arm assembly 208 may then, when the arm assembly is in a first position corresponding to the deployed position of the platform assembly 200 be spaced above the ground surface 107 as shown in FIG. 3.

In the illustrated embodiment, the arm assembly 208 includes a pivot joint 210 at the first end to permit pivotal attachment of the arm assembly to the vehicle (e.g., to the attachment apparatus (mounting plate 206)). Thus, the arm assembly 208 may pivot, about the first end, through a defined range about a first transverse pivot axis 211 defined by the pivot joint 210. For example, the arm assembly 208 may pivot about the first pivot axis 211 between the first position (corresponding to the first or deployed position of the platform assembly 200) and a second position (corresponding to a second or stowed position of the platform assembly see, e.g., FIG. 5). Similarly, the platform 202 may be pivotally coupled to a second, opposite end of the arm assembly 208. The platform 202 may be able to pivot, relative to the arm assembly, about a second transverse axis 213 defined by the pivot joint 212. As used herein, "transverse" refers to a direction orthogonal to a longitudinal or fore-and-aft axis of the vehicle 100.

The arm assembly 208, as further described below, may include a first arm member, e.g., a tubular tunnel 214, which may receive a second arm member, e.g., a slide 216, in a telescoping relationship as further explained below. The arm assembly 208 may also include a latch mechanism or assembly 218 that, among other uses, may immobilize the slide 216 (or otherwise limit the ability of the slide to travel) relative to the tunnel 214 when the platform assembly is in the first or deployed position as illustrated in FIGS. 3 and 4.

The exemplary arm assembly 208 may be configured to telescope as described herein for a variety of reasons. For instance, telescoping engagement of the arm members may allow positioning of the platform (and thus the operator) at a suitable longitudinal location, e.g., a location that provides desirable access to the controls. In addition, the telescoping members may allow the platform to be stowed beneath the controls and above the lowermost portion of the frame as shown in the figures (see, e.g., FIG. 5).

While illustrated herein as using a telescoping configuration, other embodiments are certainly possible. For example, in another embodiment, the arm assembly 208 could be provided without the telescoping members and instead utilize an intermediate pivot located along the arm assembly. This intermediate pivot could permit the platform and rear portion of the arm assembly to fold upwardly (counterclockwise in FIG. 3) relative to the forward portion of the arm assembly. Other configurations that allow positioning of the platform at the desired location during use while also permitting stowage in a manner similar to that described herein are also possible without departing from the scope of the invention.

The exemplary platform 202 may include foot surfaces 203a and 203b as illustrated in FIG. 4. The surfaces 203a and 203b may be located to position the operator's feet (and the operator's center of gravity 143 (CG)) over the pivot axis 213 of the pivot joint 212. The angle of the platform 202 (and thus the angle of the foot surfaces) relative to the arm assembly 208 may thus change as the loader 100 traverses undulations in terrain. Mechanical stops, described in more detail below, may be provided to limit the pivotal movement of the platform 202 relative to the arm assembly, e.g., relative to the slide 216, to about 40 degrees or less (e.g., 35 degrees) in a first direction 245 (clockwise as viewed in FIG. 3), and about 5 degrees or less (e.g., zero degrees) in a second (counterclockwise) direction 247 (from a default or unloaded position as illustrated in FIG. 3).

While described as including various mechanical stops to limit pivotal motion of the platform 202, those of skill in the art will realize that such stops are exemplary only and embodiments utilizing stops of a different configuration are certainly possible. For instance, an alternative embodiment may eliminate one stop so that the platform is not limited in the first or clockwise direction 245. As a result, such a platform 202 could pivot about the pivot joint 212 so that a bottom surface of the platform could lie against the loader 100 when the platform assembly is in the stowed position.

Figure 5:
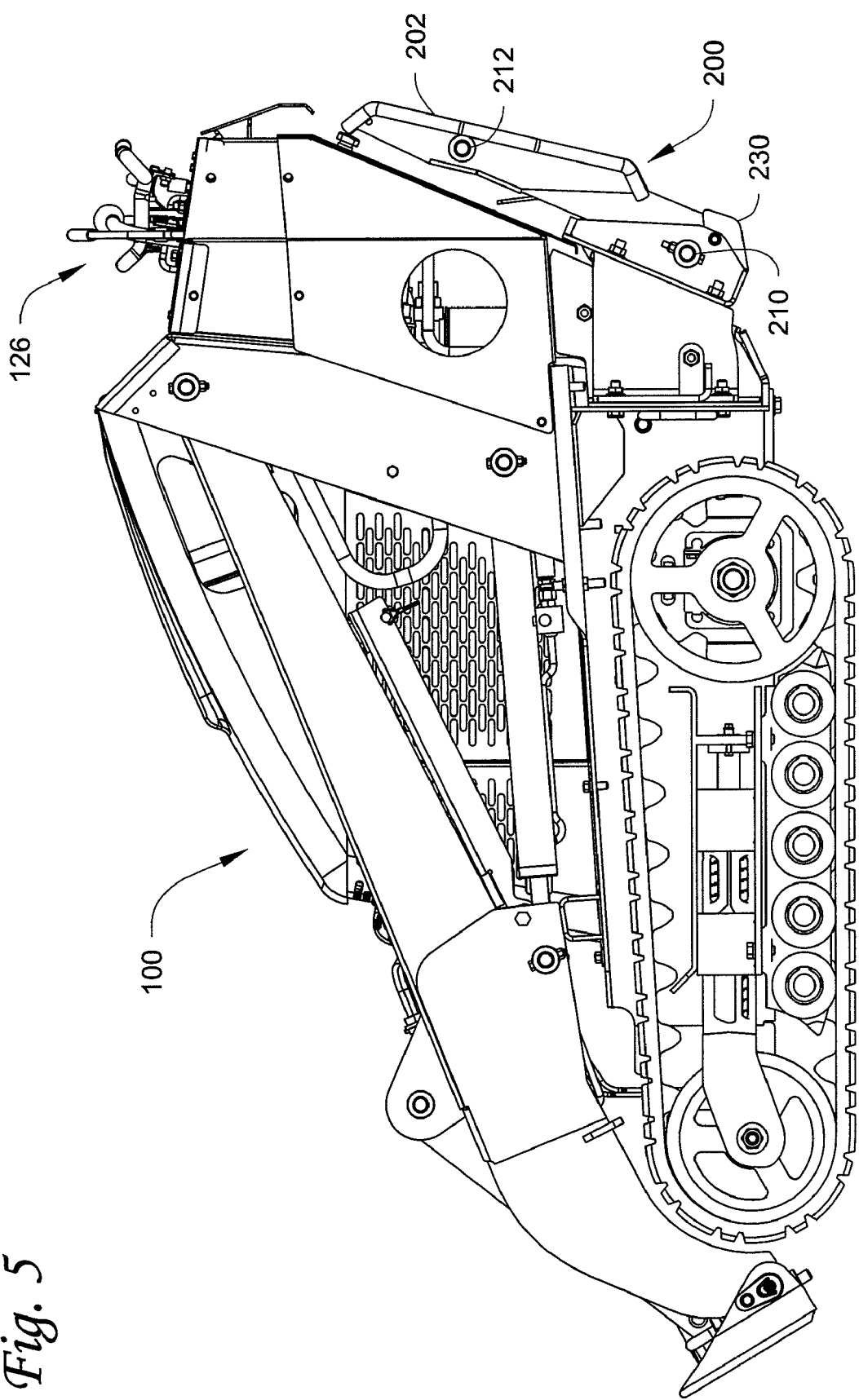
FIG. 5 a left side elevation view of the vehicle of FIG. 3, but with the platform assembly shown in a second or stowed position.

As stated above, the arm assembly 208 may be pivotable, relative to the mounting plate 206, about the pivot axis 211 of the pivot joint 210 (see FIG. 4) between the first position (see FIG. 3) and the second position (see FIG. 5). As a result, the platform assembly 200 may correspondingly pivot between the deployed position and the stowed position. In one embodiment, the arm assembly 208 may pivot about 75 degrees between the first position and the second position.

In the illustrated embodiment, the platform assembly 200 may include a stop member to limit the lowermost position of the arm assembly 208 when the latter is in the first position.

Figure 6:
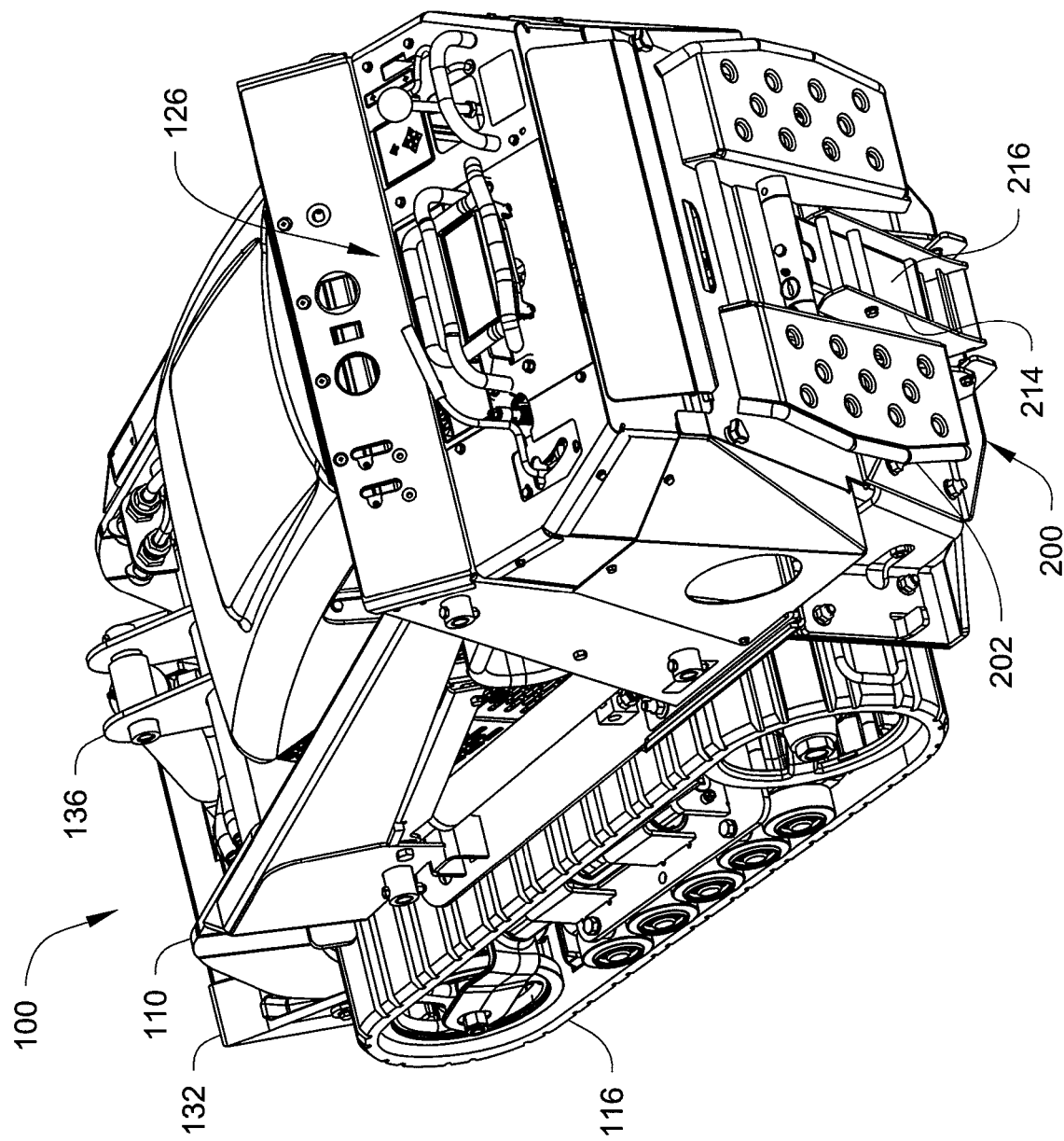
FIG. 6 is a left rear perspective view of the vehicle and platform assembly of FIG. 5.

FIGS. 5 and 6 illustrate the loader 100 with the platform assembly 200 attached and in the second or stowed position. With the platform assembly 200 in the second or stowed position, the loader may be controlled in a conventional, e.g., walk-behind, manner. As further described below, the latch assembly 218 (see FIGS. 3 and 4) may also be used to secure the platform assembly relative to the vehicle 100 when in the stowed position.

Figure 7:
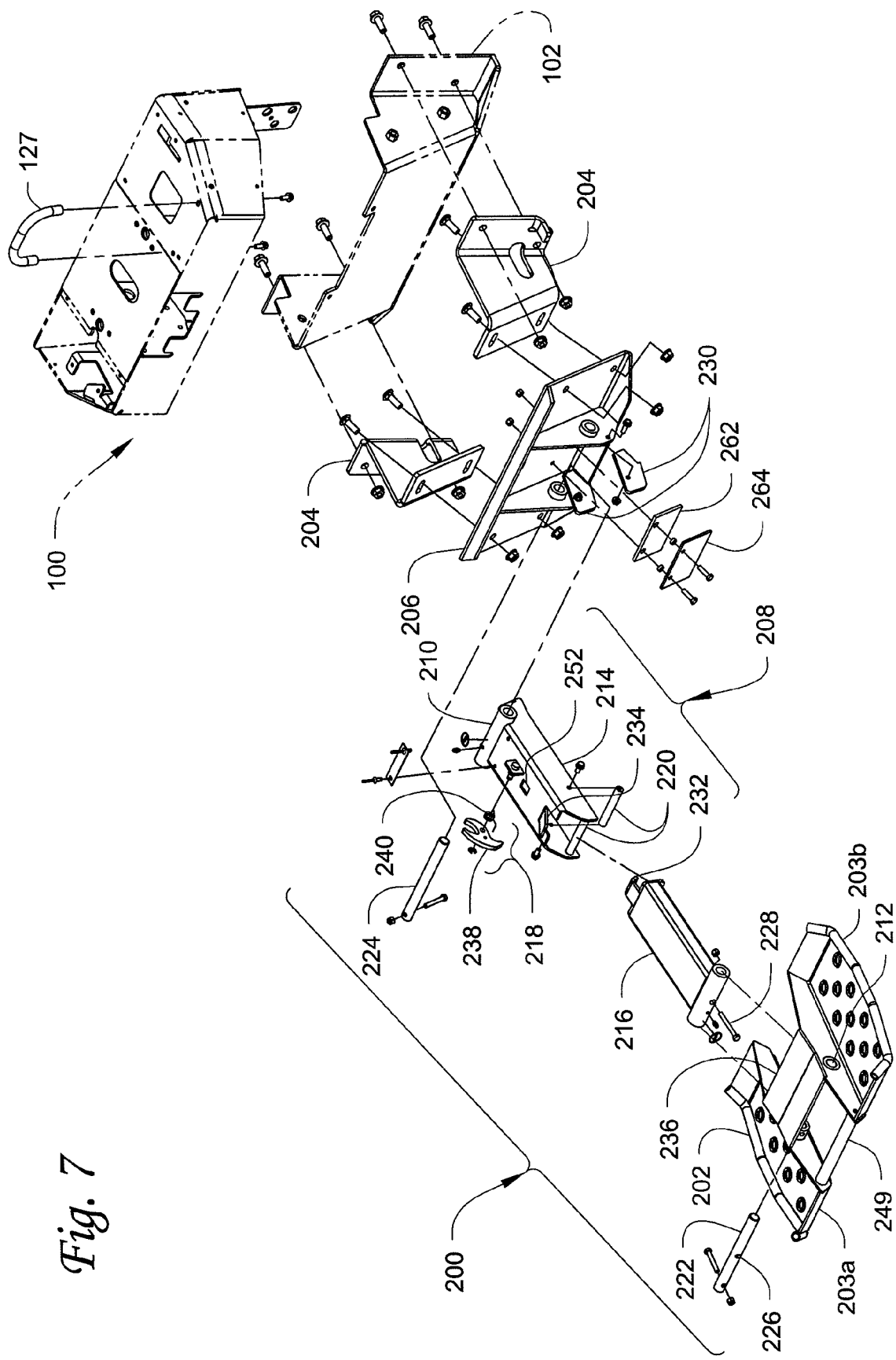
FIG. 7 is an exploded view of a platform assembly in accordance with one embodiment of the invention.

FIG. 7 illustrates an exploded view of the platform assembly 200, a portion of the vehicle 100, and associated attachment components in accordance with one embodiment of the invention. As illustrated in this view, the attachment members 204 may attach, e.g., bolt, to the frame 102 of the loader 100 and the mounting plate 206 may attach, e.g., bolt, to the attachment members. The slide 216 may slide into the tunnel 214 where it may be supported by the upper interior surface of the tunnel and one or more pins 220 (in the illustrated embodiment, one of the pins 220 is integral, e.g., welded, with the tunnel 214, while the other is fastened thereto). The slide 216 may attach to the platform 202 at the pivot joint 212 via a pin 222. Similarly, the tunnel 214 may pivotally attach to the vehicle, e.g., to the mounting plate 206, at the pivot joint 210 via the pin 224.

The mounting plate 206 may further incorporate one or more bumpers 230 (see also FIG. 5). The bumpers 230 may protect the platform assembly 200 (when it is in the second or stowed position) in the event the loader 100 contacts an obstacle during use. While shown as fastening to the mounting plate 206 in the figures, other embodiments may integrally incorporate the bumpers 230, e.g., incorporate them on the mounting plate or the attachment members 204.

The pin 222 used to secure the platform 202 to the slide 216 may include a slot 226 that receives a shear bolt 228. The slot shape may define the pivot range of the platform 202, and may further act to ultimately shear the pin 228 rather than damage other components in the event the platform is exposed to an excessive pivoting force.

As shown in FIG. 7, the slide 216 may also include a tab 232 that interacts with the latch assembly 218 as further described below. Moreover, the tunnel 214 may include a catch 234 that receives a portion 236 of the platform 202 when the platform assembly 200 is in the second or stowed position (see FIGS. 5 and 6).

FIGS. 8A-8E illustrate cross sections of the exemplary platform assembly 200 as it may be attached to the loader 100 (not shown in these views). The section views are taken along a longitudinal, vertical plane passing through a middle section of the assembly 200.

FIG. 8A illustrates the platform assembly 200 in the second or stowed position. As shown in this view, when the platform assembly 200 is in the second or stowed position, the slide 216 retracts into the tunnel 214 until the tab 232 contacts the pivot joint 210. In this position, the portion 236 of the platform 202 may slide underneath the catch 234 to reduce relative movement (e.g., pivoting) of the platform 202 relative to the arm assembly 208.

As shown in FIG. 8A, the latch assembly 218 may secure the platform assembly 200 (relative to the loader 100) in the second or stowed position. The latch assembly 218 may include a latch member 238 pivotally attached to a portion of the tunnel 214, and a biasing member, e.g., a torsion spring 240 (see FIG. 7). The torsion spring 240 may bias the latch member 238 in a clockwise direction when viewed in FIG. 8A.

The latch member 238 may include a first finger 242 that extends through a window 244 formed in the mounting plate 206 and engages an inner or opposite side of the mounting plate when the platform assembly is in the stowed position. A second finger 246 may similarly contact an outer side or portion of the mounting plate 206, while a third finger 258 may contact a surface of the slide 216 through an opening 252 formed in the tunnel 214 (see also FIG. 7). As the third finger 258 is in contact with the slide 216 as shown in FIG. 8A, it may prevent rotation of the biased latch member 238 and thus may keep the first and second fingers 242 generally immobilized such that the platform assembly 200 remains secured in the second or stowed position.

Once again, while not illustrated herein, other embodiments may form the pivot joint 210 directly on the frame 102 of the vehicle, e.g., the separate mounting plate 206 and corresponding attachment members 204 may be unnecessary. In such a configuration, the window 244 could be formed directly through a corresponding portion of the vehicle frame 102.

Figure 8B:
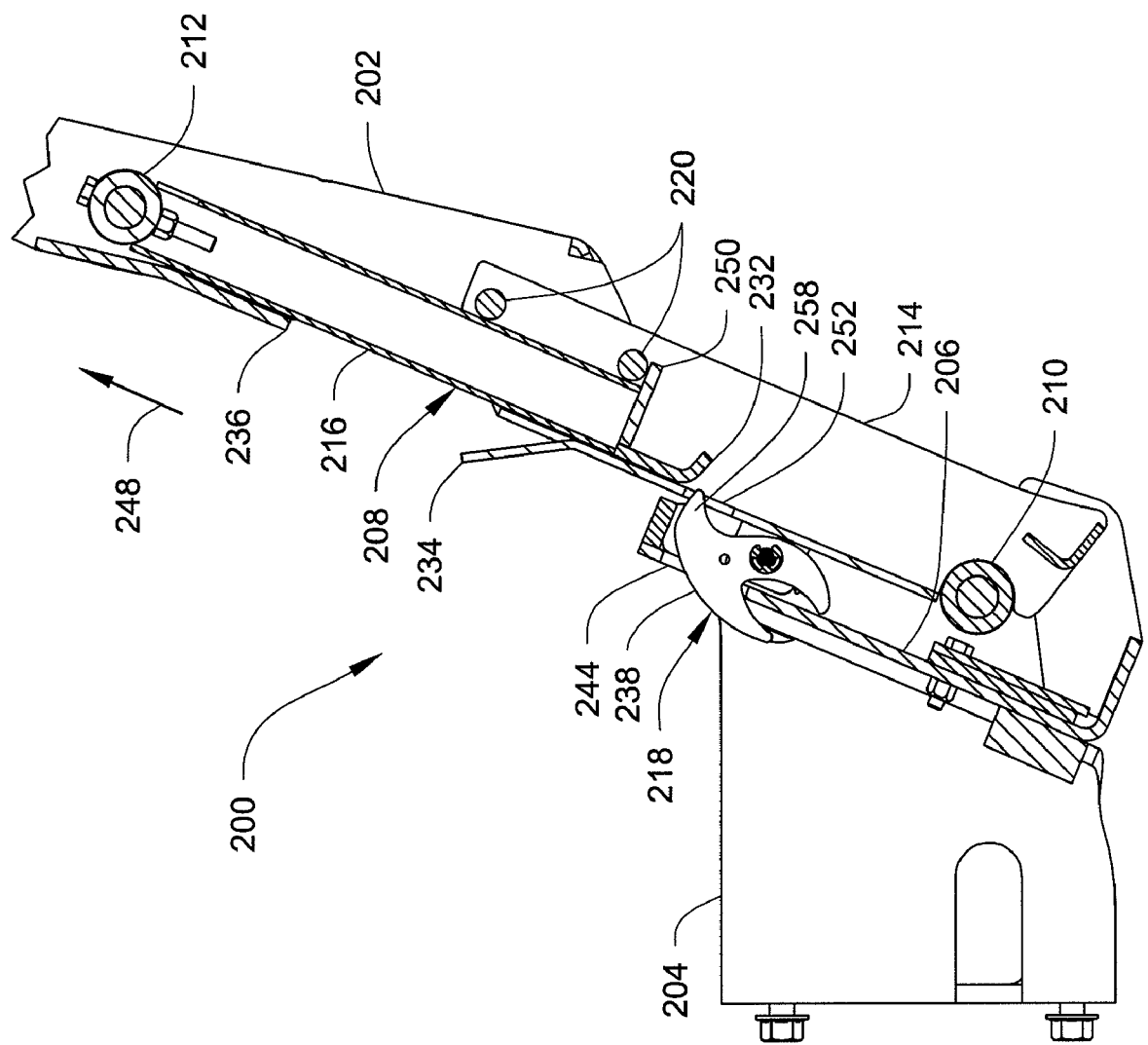

To reposition the platform assembly 200 to the first or deployed position, the operator may apply an upward force, e.g., a lifting force 248, to the platform 202 as shown in FIG. 8B. The platform may include a handle portion 249 (see FIGS. 7 and 8A) to assist with applying this upward force. As the lifting force is applied, the slide 216 may translate or telescope out of the tunnel 214 as illustrated. When the slide 216 is fully withdrawn from the tunnel 214, a lip 250 on the slide may engage one of the pins 220 in the tunnel as shown to prevent separation. At this point, the tab 232 of the slide 216 has also moved past the opening 252 (see also FIG. 7) formed in the tunnel 214 as shown in FIG. 8B.

Figure 8C:
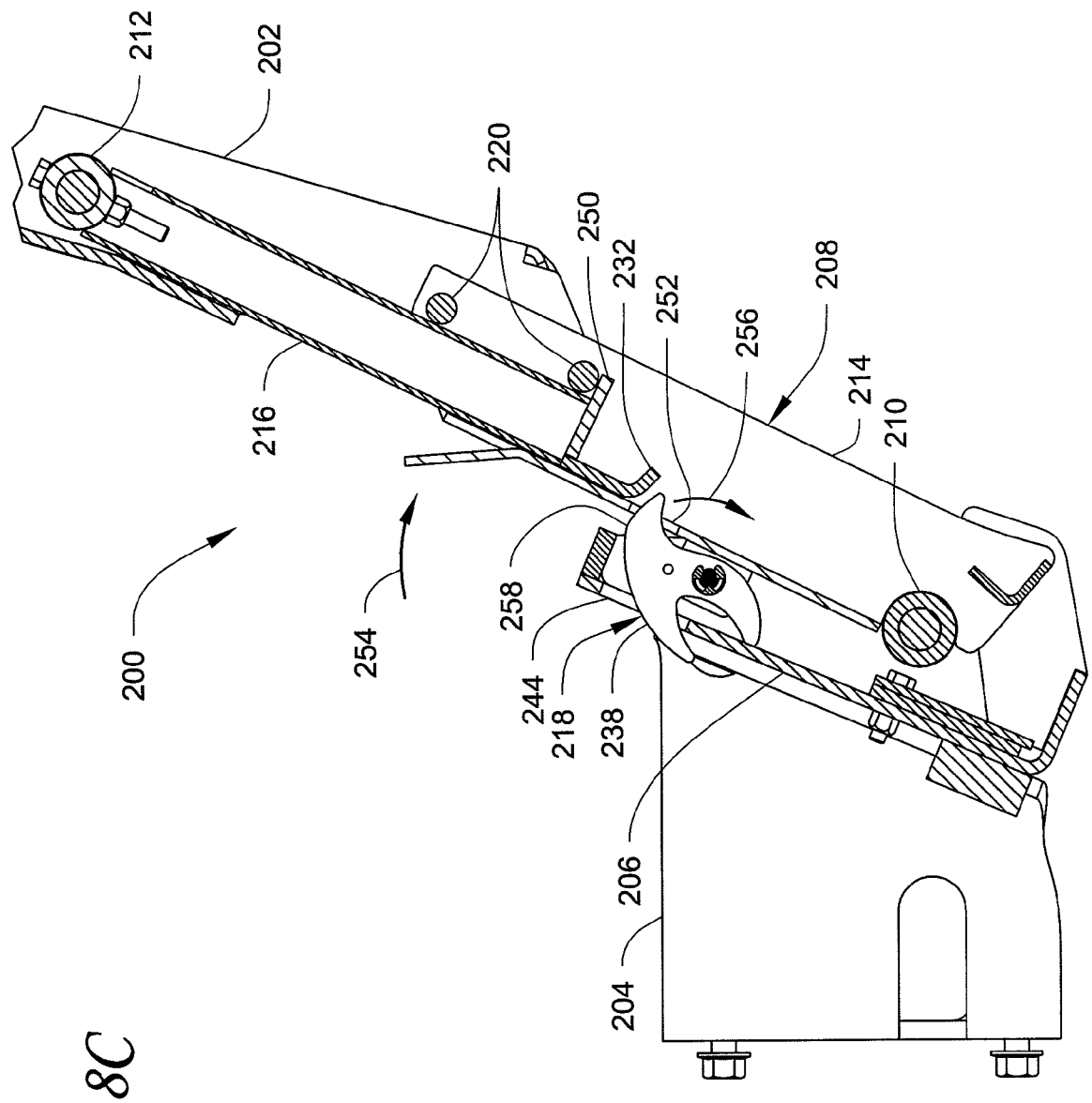

With the slide 216 retracted from the tunnel 214, the platform assembly 200 may be pivoted in the direction 254 from the second or stowed position towards the first or deployed position as shown in FIG. 8C. As the platform assembly 200 is pivoted in the direction 254, the latch member 238 of the latch assembly 218 may pivot, under the biasing force of the spring 240 (see FIG. 7) in the direction 256. Such movement of the latch member 238 may be permitted as the third finger 258 of the latch member 238 is free to move into the opening 252 and enter the interior of the tunnel 214.

FIG. 8D illustrates the platform assembly 200 after further rotation in the direction 254. As illustrated in this view, pivoting of the latch member 238 not only places the third finger 258 of the latch member into the tunnel 214, it may also allow the first finger 242 to withdraw from the window 244 so that the platform assembly 200 is free to pivot to the first or deployed position.

Figure 8E:
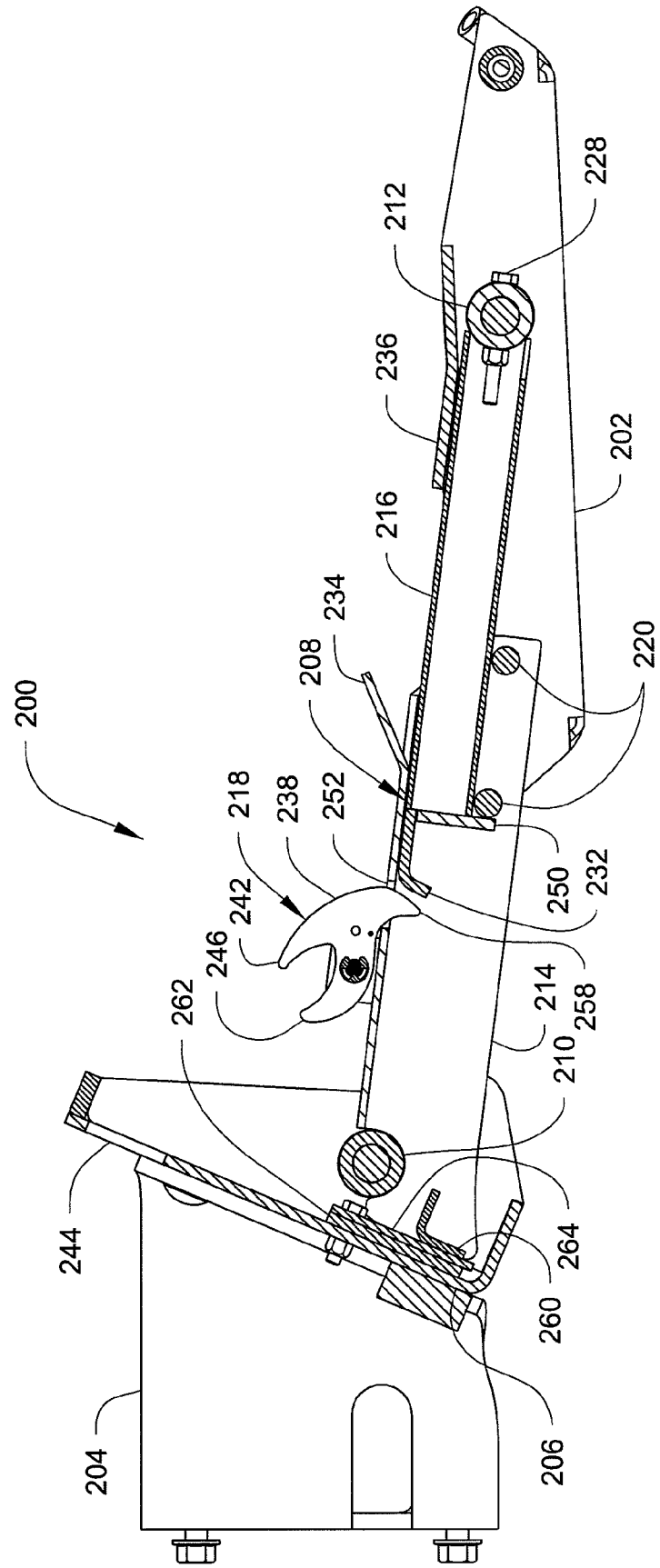

FIG. 8E illustrates the platform assembly after it has reached the first or deployed position. The exact location of the deployed position may be controlled by configuring a stop member or surface 260 of the arm assembly 208, e.g., of the tunnel 214 (see also FIG. 8D), so that it operatively rests against or contacts a corresponding fixed member or surface 264 (see also FIG. 7) of the vehicle or vehicle attachment apparatus (e.g., mounting plate 206) as shown in FIG. 8E. In one embodiment, an isolation member, e.g., a elastomeric isolation pad 262 as shown in FIGS. 7, 8D, and 8E, may be provided between the surface 264 and the mounting plate 206 to dampen vibrations, impacts, and other dynamic loads. Operable contact of the surfaces 260 and 264 may prevent the arm assembly 208 from pivoting (about the pivot axis 211) downwardly beyond its first position (and thus prevent the platform assembly from pivoting beyond its deployed position). As a result, a lowermost elevation of the second end of the arm assembly 208 may remain spaced above the ground surface during normal platform operation.

The platform assembly 200 may, once released from the second or stowed position, seek the first or deployed position via gravity, e.g., no biasing members are included in the illustrated embodiment to bias the platform to either the deployed or stowed positions. However, other embodiments that include some sort of biasing or damping member, e.g., a gas cylinder, are contemplated to, for example, slow the descent of the platform assembly 200 towards the first or deployed position and/or to hold the platform in the second or stowed position.

As clearly visible in FIG. 8E, the third finger 258 of the latch member 238 may be configured to act as a stop to operatively limit translation of the slide 216 into the tunnel 214 when the platform assembly 200 is in the first or deployed position. As a result, the slide 216 may maintain generally the same position relative to the tunnel 214 (although some play may be permitted) during loader operation.

To return the platform assembly 200 to the second or stowed position, the process described in FIGS. 8A-8E may be reversed. That is, the platform assembly 200 may be rotated back towards the second or stowed position. Once the second finger 246 of the latch member 238 contacts the mounting plate 206, the latch member may begin to pivot. Further pivoting of the platform assembly 200 may result in engagement of the first finger 242 with the mounting plate as shown in FIG. 8B. As this occurs, the third finger 258 may move out of the opening 252, permitting the slide 216 to, once again, move into the tunnel 214. Ultimately, the latch assembly 218 may secure the platform assembly 200 as shown in FIG. 8A.

During operation of the loader 100, the platform assembly 200 (when in the deployed position) may support the operator at a location spaced above the ground surface 107 (see FIGS. 3 and 4). Although not illustrated herein, some embodiments of the invention may include one or more counterweights, e.g., weights attached to the front of the loader 100, to counteract the moment resulting from cantilevered support of the operator. In other embodiments, the CG of the operator may be sufficiently close to the rear of the loader that such counterweights are unnecessary. In still other embodiments, rear counterweights that are otherwise normally installed may be removed due to the added weight of the platform assembly 200 and operator.

By incorporating both the pivot joints 210 and 212, embodiments of the platform assembly 200 described and illustrated herein may provide various benefits. For example, the pivot joint 212 (see FIG. 8E) may allow a slight degree of rocking of the platform 202 to dissipate ground-induced forces that would otherwise be transmitted directly to the operator. Moreover, the pivot joint 212 may permit the operator to remain generally vertical or straight up (e.g., maintain the platform 202 in a generally horizontal orientation) as the vehicle traverses uneven ground. For example, in a situation where the rear portion of the loader 100 lifts upwardly (e.g., the front of the loader pitches forward), the platform 202 may pivot (in the clockwise direction 245 in FIG. 3), relative to the arm assembly 208, about the pivot joint 212 (see FIG. 4). As a result, the platform (e.g., the foot surfaces) may remain in a generally horizontal orientation.

In another instance, the platform assembly 200 (e.g., platform 202 and/or arm assembly 208) could, at times, contact a ground undulation. When this occurs, the platform assembly 200 may be displaced upwardly, e.g., it may pivot (counterclockwise in FIG. 3) about the pivot 210 such that the stop surface 260 moves away from the surface 264 (see FIG. 8E). The ability to accommodate this displacement permits the platform 202 to initially contact and momentarily ride up and along the ground undulation. As platform displacement is accomplished by pivoting along an arc defined by the pivot joint 210, initial platform movement may be generally upward and to the rear, e.g., counterclockwise in FIGS. 3 and 8E. Stated alternatively, due to the platform 202 and pivot joint 212 being below the pivot joint 210, there may be a tendency for the platform and operator to initially move upwardly and rearwardly away from the loader 100 in this instance. However, this rearward pivoting about the pivot joint 210 is illustrative only, and other embodiments wherein the platform assembly is biased for forward pivoting, or embodiments that remove the pivot joint 210 completely (e.g., rigid attachment of the arm assembly to the vehicle), are possible without departing from the scope of the invention.

The platform 202 may also be configured to contact and traverse periodic ground undulations in an effective manner. For example, the shape of the lower side of the platform (e.g., the approach and departure angles of the platform) and the shape of the peripheral edges may be designed to avoid "digging in" in the event that the platform contacts the ground. Optionally, the lower side of the platform assembly 200, e.g., the platform 202 and/or the arm assembly 208, may include some sort of wear plates or pads to present a relative smooth (and possibly replaceable) surface in case of contact with the ground surface.

While not illustrated herein, the platform assembly 200 may further incorporate additional pivot joints. For example, a pivot joint that permits the platform 202 to pivot about a generally longitudinal axis of the loader could be included to allow side-to-side (or "roll") pivoting of the platform where such platform motion would be desirable. In another embodiment, the platform could pivot about a generally vertical pivot joint, e.g., a pivot joint located at either end of the arm assembly 208, to allow twisting or "yaw" movement of the platform.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are described and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A platform assembly for use with a ground traversing vehicle, the platform assembly comprising:
    an elongate arm assembly comprising a first end and a second end, the first end operable to attach to the vehicle such that the arm assembly, when in a first position, forms a cantilever supported by the vehicle at the first end such that the second end of the arm assembly is spaced above a ground surface, wherein the first end of the arm assembly comprises a pivot joint configured to pivotally attach the arm assembly to the vehicle such that the arm assembly may pivot, relative to the vehicle, about the first end between the first position and a second position; and
    an operator platform pivotally attached to the second end of the arm assembly for pivoting of the platform, relative to the arm assembly, about a transverse pivot axis.

2. The platform assembly of claim 1, wherein the arm assembly further comprises: a first arm member; and a second arm member, wherein the first arm member receives the second arm member in a telescoping relationship.

3. A platform assembly for supporting an operator relative to a vehicle and at a location spaced above a ground surface, the platform assembly comprising:
    an attachment apparatus for attaching the platform assembly to the vehicle;
    an arm assembly comprising: a first end and a second end, the first end pivotally attached to the attachment apparatus for pivoting of the arm assembly about a first transverse axis, between: a first position corresponding to a deployed position of the platform assembly; and a second position corresponding to a stowed position of the platform assembly; and
    an operator platform pivotally attached to the second end of the arm assembly for pivoting of the platform, relative to the arm assembly, about a second transverse axis, wherein when the platform assembly is in the deployed position, the operator platform is supported by the arm assembly above the ground surface.

4. The platform assembly of claim 3, wherein the arm assembly further comprises a stop member that rests against the attachment apparatus to prevent the arm assembly from pivoting beyond the first position.

5. The platform assembly of claim 4, further comprising an isolation member positioned between the stop member and the attachment apparatus.

6. The platform assembly of claim 3, wherein the operator platform is configured to support the operator in a standing position.

7. The platform assembly of claim 3, wherein the platform assembly further comprises at least one mechanical stop to limit pivotal movement of the platform: in a first direction about the second transverse axis to about 40 degrees or less from horizontal; and in a second direction about the second transverse axis to about 5 degrees or less from horizontal.

8. The platform assembly of claim 3, wherein the arm assembly further comprises: a first arm member; and a second arm member, wherein the first arm member receives the second arm member in a telescoping relationship.

9. The platform assembly of claim 8, wherein the arm assembly further comprises a latch mechanism to selectively limit movement of the second arm member relative to the first arm member when the platform assembly is in the deployed position.

10. The platform assembly of claim 9, wherein the latch mechanism is further operable to secure the platform assembly in the stowed position.

11. A platform assembly for supporting an operator on a vehicle, the platform assembly comprising:
    an arm assembly comprising:
        a first end pivotally attached to a rear portion of the vehicle for pivoting about a first pivot axis;
        a second end opposite the first end;
        a stop member proximate the first end of the arm assembly, the stop member configured to limit pivotal motion of the arm assembly about the first pivot axis such that a lowermost elevation of the second end of the arm assembly is generally limited to elevations spaced above a ground surface; and
    a platform pivotally attached to the second end of the arm assembly for pivoting of the platform about a second pivot axis.

12. The platform assembly of claim 11, wherein the first pivot axis and the second pivot axis are both transverse to the vehicle.

13. The platform assembly of claim 11, wherein the platform is configured to position a center of gravity of the operator over the second pivot axis.

14. The platform assembly of claim 11, wherein the arm assembly is pivotable about the first pivot axis between at least a first position corresponding to a deployed position of the platform assembly, and a second position corresponding to a stowed position of the platform assembly.

15. The platform assembly of claim 14, wherein the aim assembly further comprises: a first arm member; and a second arm member, wherein the first arm member forms a tube that receives the second arm member in a telescoping relationship.

16. The platform assembly of claim 15, wherein the arm assembly further comprises a latch mechanism to selectively: immobilize the second arm member relative to the first arm member when the platform assembly is in the deployed position; and secure the platform assembly relative to the vehicle when the platform assembly is in the stowed position.

17. The platform assembly of claim 16, wherein the latch mechanism comprises a latch member pivotally attached to the first arm member, the latch member comprising a first finger to operatively engage the vehicle when the platform assembly is in the stowed position, and another finger to operatively limit translation of the second arm member relative to the first arm member when the platform assembly is in the deployed position.

18. The platform assembly of claim 11, the arm assembly further comprising at least one mechanical stop to limit the pivotal movement of the platfoiin in a first direction about the second pivot axis to about 40 degrees or less from horizontal.

* * * * *

UNITED STATES PATENT AND TRADEMARK OFFICE
CERTIFICATE OF CORRECTION

| | | |
|---|---|---|
| PATENT NO. | : 7,980,569 B2 | |
| APPLICATION NO. | : 12/029791 | |
| DATED | : July 19, 2011 | |
| INVENTOR(S) | : Azure et al. | |

It is certified that error appears in the above-identified patent and that said Letters Patent is hereby corrected as shown below:

In column 12, line 40, delete "aim" and insert --arm--.

Signed and Sealed this
Twenty-second Day of November, 2011

David J. Kappos
*Director of the United States Patent and Trademark Office*